United States Patent
St. Onge

[11] Patent Number: 5,991,434
[45] Date of Patent: Nov. 23, 1999

[54] IC LEAD INSPECTION SYSTEM CONFIGURABLE FOR DIFFERENT CAMERA POSITIONS

[76] Inventor: James W. St. Onge, 1105 Eagle Nest Dr., Milford, Mich. 48381

[21] Appl. No.: 08/747,728

[22] Filed: Nov. 12, 1996

[51] Int. Cl.⁶ .................... G01B 11/03; G06K 9/00
[52] U.S. Cl. .................... 382/146; 382/151; 382/154
[58] Field of Search .................... 382/145, 146, 382/148, 149, 151, 154; 348/87, 126; 356/376, 384, 383, 237.1, 237.2, 237.3, 240.1; 250/559.34

[56] References Cited

U.S. PATENT DOCUMENTS

| | | | |
|---|---|---|---|
| 5,043,589 | 8/1991 | Smedt et al. | 350/361 |
| 5,347,363 | 9/1994 | Yamanaka | 356/376 |
| 5,402,505 | 3/1995 | Roy et al. | 382/146 |
| 5,414,458 | 5/1995 | Harris et al. | 348/92 |
| 5,452,080 | 9/1995 | Tomiya | 356/237 |
| 5,528,371 | 6/1996 | Sato et al. | 356/372 |
| 5,745,593 | 4/1998 | Wahawisan et al. | 382/146 |

*Primary Examiner*—Jose L. Couso
*Assistant Examiner*—Brian P. Werner
*Attorney, Agent, or Firm*—St.Onge Steward Johnston & Reens LLC

[57] ABSTRACT

A system for inspecting leads of an IC using at least one camera is provided, where the system permits configuration of the camera to various positions. The camera provides a digitized frame of the IC leads. The system includes a set of configurable parameters for defining which leads of the IC are imaged in which of the digitized frames. The system also includes a computer for calculating the position of the leads on the IC being inspected in three dimensions, and for comparing these calculated positions to ideal known positions in determining whether the IC leads meet desired manufacturing tolerances.

4 Claims, 7 Drawing Sheets

FIG. 3a
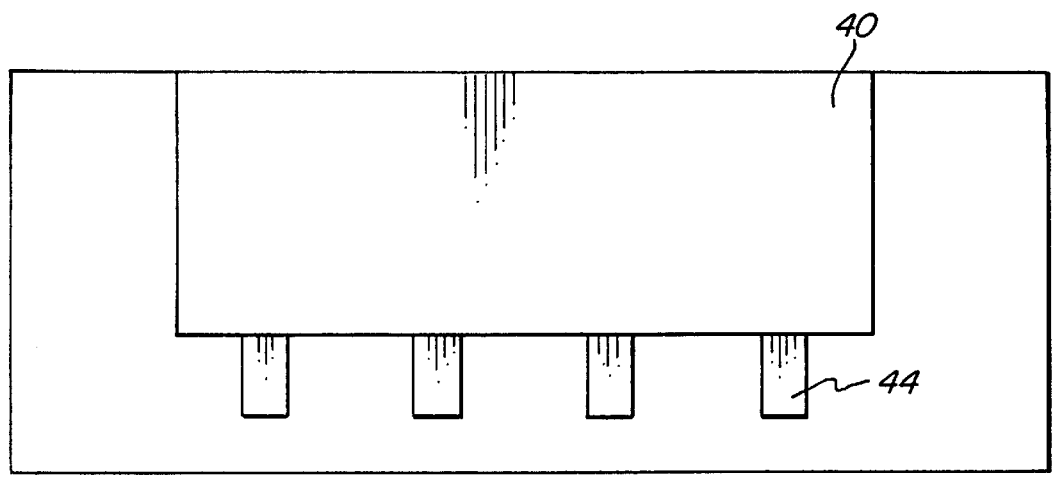
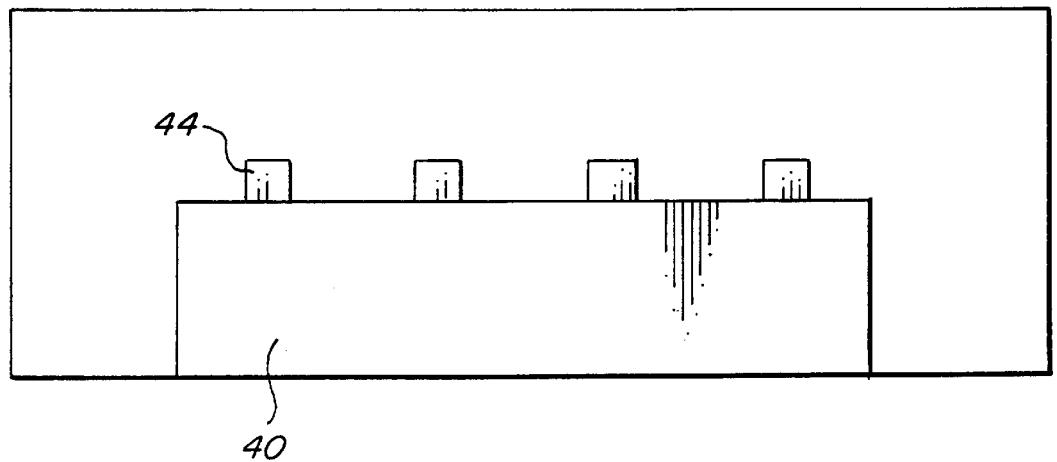
FIG. 3b

VIEW INFORMATION

| VIEW | CAMERA # | LEAD ORIENT. | LEAD NO. DIR. | X,Y MIRROR |
|---|---|---|---|---|
| TOP A | 1 | SOUTH | POS | N,N |
| SIDE A | 1 | NORTH | POS | N,Y |
| TOP C | 2 | SOUTH | POS | N,N |
| SIDE C | 2 | NORTH | POS | N,Y |

INTRINSIC CAMERA PARAMETERS

| | [hp] | | io, jo | [F] |
|---|---|---|---|---|
| CAMERA # | Y-PIXEL SIZE | [A] | IMG. CENTER | FOCAL LENGTH |
| 1 | 0.29134 | 0.77 | 0, 0 | ? |
| 2 | 0.29134 | 0.77 | 0, 0 | ? |

EXTRINSIC CAMERA PARAMETERS

| | | | | CENTER LOCATION | |
|---|---|---|---|---|---|
| VIEW | α | β | θ | CAMERA | CAM. DIST. |
| TOP A | 20 | 0 | 0 | ?, ?, ? | 10,000 |
| SIDE A | 80 | 0 | 0 | ?, ?, ? | 10,150 |
| TOP C | -20 | 0 | 180 | ?, ?, ? | 10,000 |
| SIDE C | -80 | 0 | 180 | ?, ?, ? | 10,150 |

CAMERA POSITION (last column grouping)

*FIG. 6*

IC LEAD INSPECTION SYSTEM CONFIGURABLE FOR DIFFERENT CAMERA POSITIONS

FIELD OF THE INVENTION

The invention relates to systems using cameras for quality control inspection of the leads on IC chips.

BACKGROUND ART

Systems which use cameras to inspect integrated circuit ("IC") leads for quality control purposes are known. These systems are typically computer controlled and include frame grabber circuitry for digitizing images of an IC under inspection for comparison in three dimensions to an ideal IC of the same type. ICs having leads which do not meet specified inspection tolerances are rejected.

Known systems typically have control software hard-coded to function with only a particular, single type of camera/mirror arrangement. Most often, the cameras in these systems are aligned directly above, directly below or in the plane of the IC in order to simplify the determinations of coplanarity, sweep and the like with minimal difficulty.

A disadvantage of these systems is that the required camera locations may not be available in some IC manufacturing lines. This disadvantage is exacerbated by the fact that changes to the IC line—e.g., to improve throughput or reliability, or to change over to a different IC package—may render the inspection system inoperable.

Other systems disadvantageously require particular line structure, such as a shadow plate or mirrored conveying channel, and thus can not be installed without modifying the IC line.

What is desired, therefore, is an IC lead inspection system which is easy to install on a variety of IC manufacturing lines and can accommodate a wide variety of camera angles. An inspection system providing high reliability and improved accuracy is also desired.

SUMMARY OF THE INVENTION

Accordingly, it is an object of the invention to provide a system for inspecting leads of an IC which accommodates various camera angles.

Another object of the invention is to provide a system for inspecting leads of an IC which accurately and reliably inspects IC leads.

Yet another object of the invention is to provide a system for inspecting leads of an IC using a simple personal computer.

A system for inspecting leads of an IC using at least one camera is provided, where the system permits configuration of the camera to various positions. The camera provides a digitized frame of the IC leads. The system includes a set of configurable parameters for defining which leads of the IC are imaged in which of the digitized frames. The system also includes a computer for calculating the position of the leads on the IC being inspected in three dimensions, and for comparing these calculated positions to ideal known positions in determining whether the IC leads meet desired manufacturing tolerances.

BRIEF DESCRIPTION OF THE FIGURES

FIGS. 3a and 3b are images of the leads obtained from two angles by the system of FIG. 1 as illustrated in FIG. 2.

FIG. 6 is a table of the various parameters which may be configured by a user in the system of FIG. 1 in order to accommodate various camera and mirror arrangements as described with reference to FIG. 4.

DETAILED DESCRIPTION OF THE PREFERRED EMBODIMENT

Figure 1:
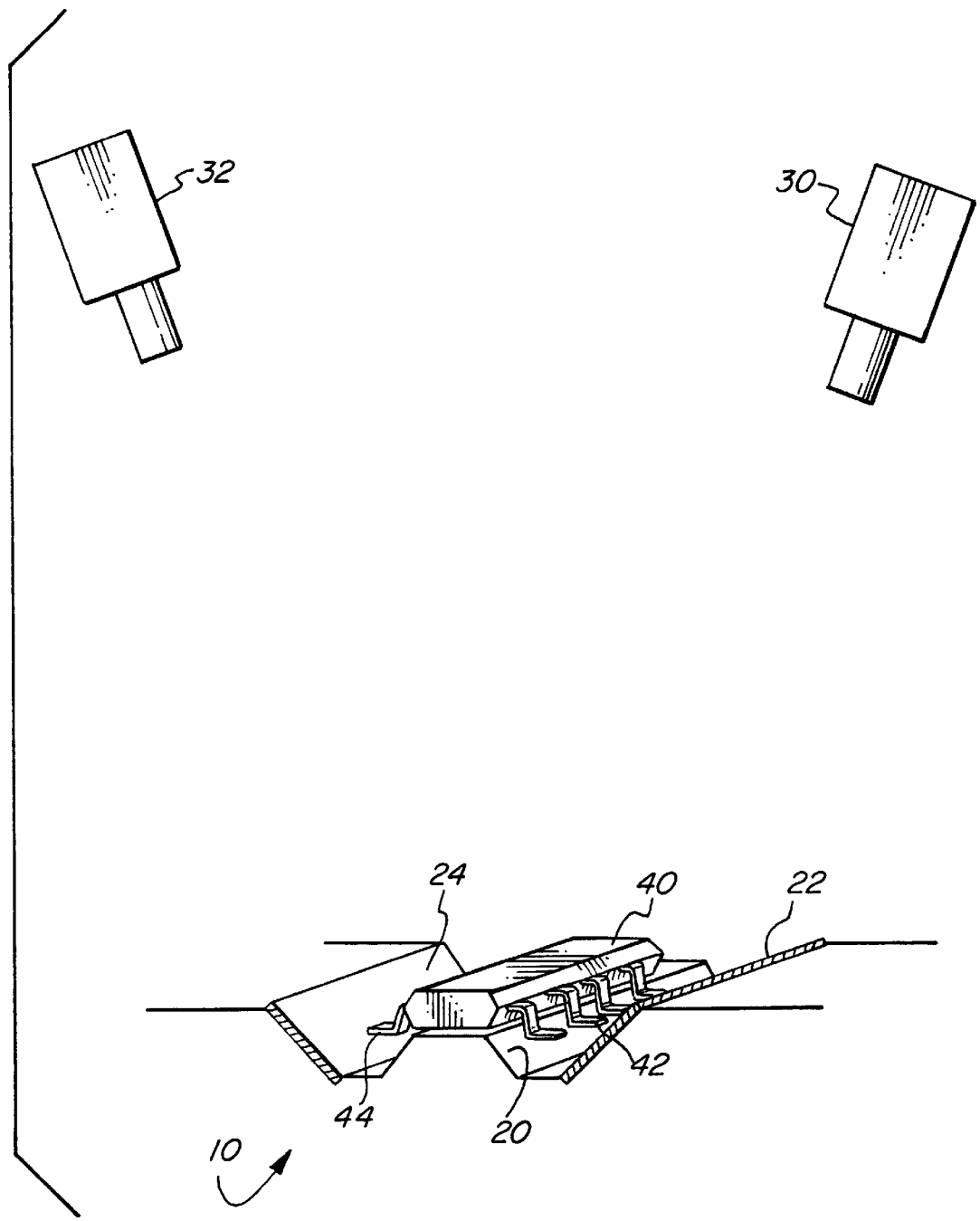
FIG. 1 is an isometric view of the IC lead inspection system of the invention illustrating an exemplary camera and a mirror arrangement.

FIG. 1 shows one embodiment of an IC lead inspection system 10 of the present invention. The IC lead inspection system 10, which is not shown to scale, includes an IC platform 20, mirrors 22, 24 positioned along the sides of the IC platform 20 and cameras 30, 32. Each camera 30, 32 is electrically coupled to a computer (not shown) via frame grabber circuitry (not shown) as known.

On the IC platform 20, there is shown an integrated circuit (IC) 40 to be inspected having two sets of leads 42, 44 along two sides of the IC 40. For purposes of clarity, the four sides of the IC 40 shown in FIG. 1 will be referred to in a clockwise direction as sides A, B, C and D, with A being the side having leads 42 and side C having leads 44. Note that although FIG. 1 shows an IC having leads along only two sides, the IC lead inspection system 10 can be modified in a manner which will become apparent to those in the art to accommodate ICs having leads along any number of sides, including all four sides. Furthermore, the IC 40 shown in FIG. 1 has "gull wing" leads 42, 44. As will be described hereinafter, the IC lead inspection system 10 of the present invention can also inspect "J" leads.

Figure 2:
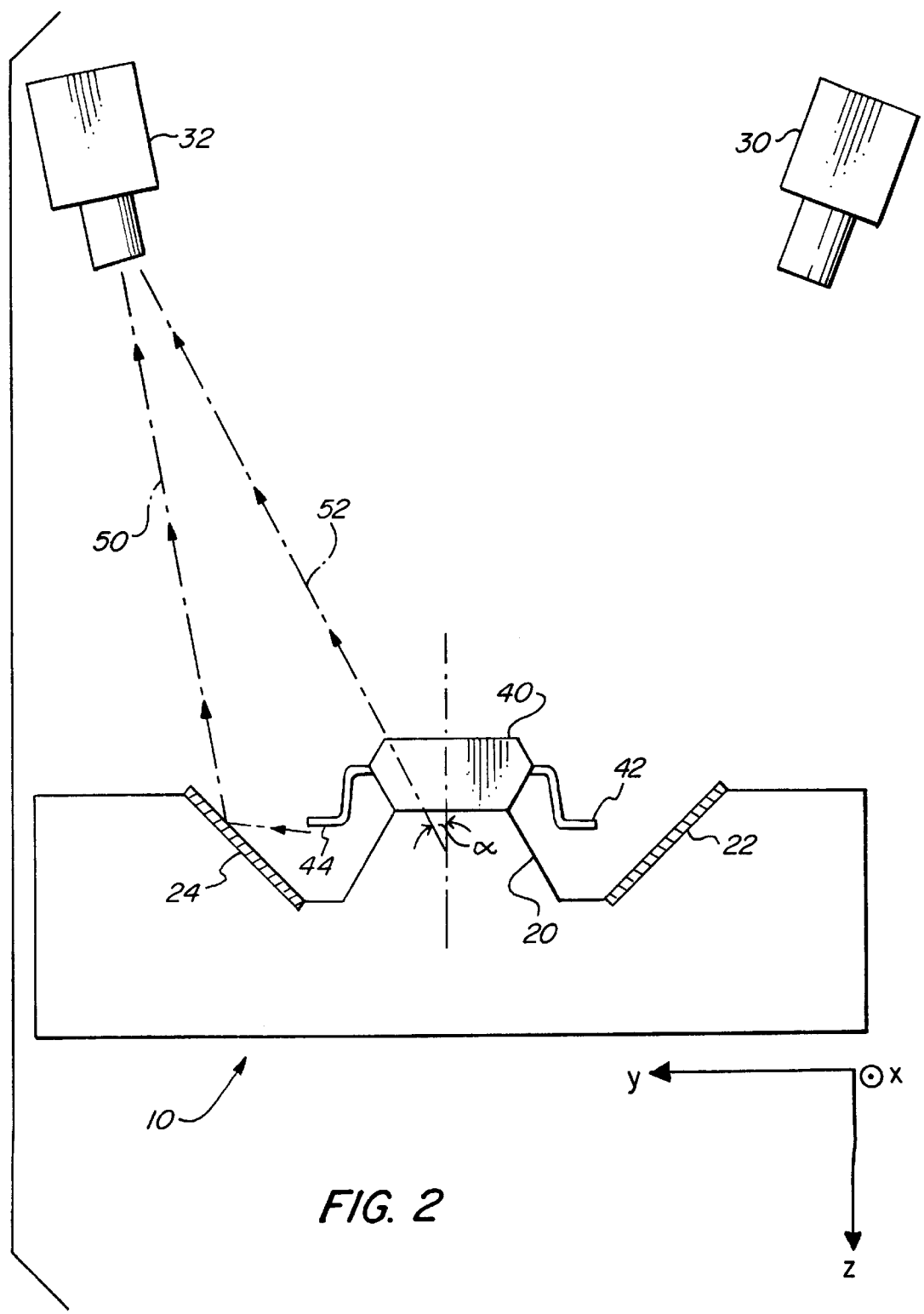
FIG. 2 is an end view of the system of FIG. 1 illustrating how each camera obtains images of the leads from two angles.

FIG. 2 is a side view of the IC lead inspection system 10 of FIG. 1. This figure shows cameras 30, 32 positioned relative to the IC 40 and mirrors 22, 24 such that each camera 30, 32 is capable of producing a side image of the leads 42, 44 and a top image of the leads 42, 44. In FIG. 2, camera 32 is shown capturing a top image 52 of the leads 44 (top image of side C), and a side image 50 of the leads 44 (side image of side C) by reflection from mirror 24. The images captured by camera 32 are illustrated in FIGS. 3a and 3b, where FIG. 3a shows the top view of the leads 44 while FIG. 3b shows the side view of the leads 44. Although not illustrated, camera 30 likewise captures a top image (top image of side A) and a side image of leads 42 (side image of side A). Preferably, there is a backlight (not shown) positioned underneath the IC platform 20 to illuminate the platform 20 to aid in the production of images for the leads 42, 44.

Figure 4:
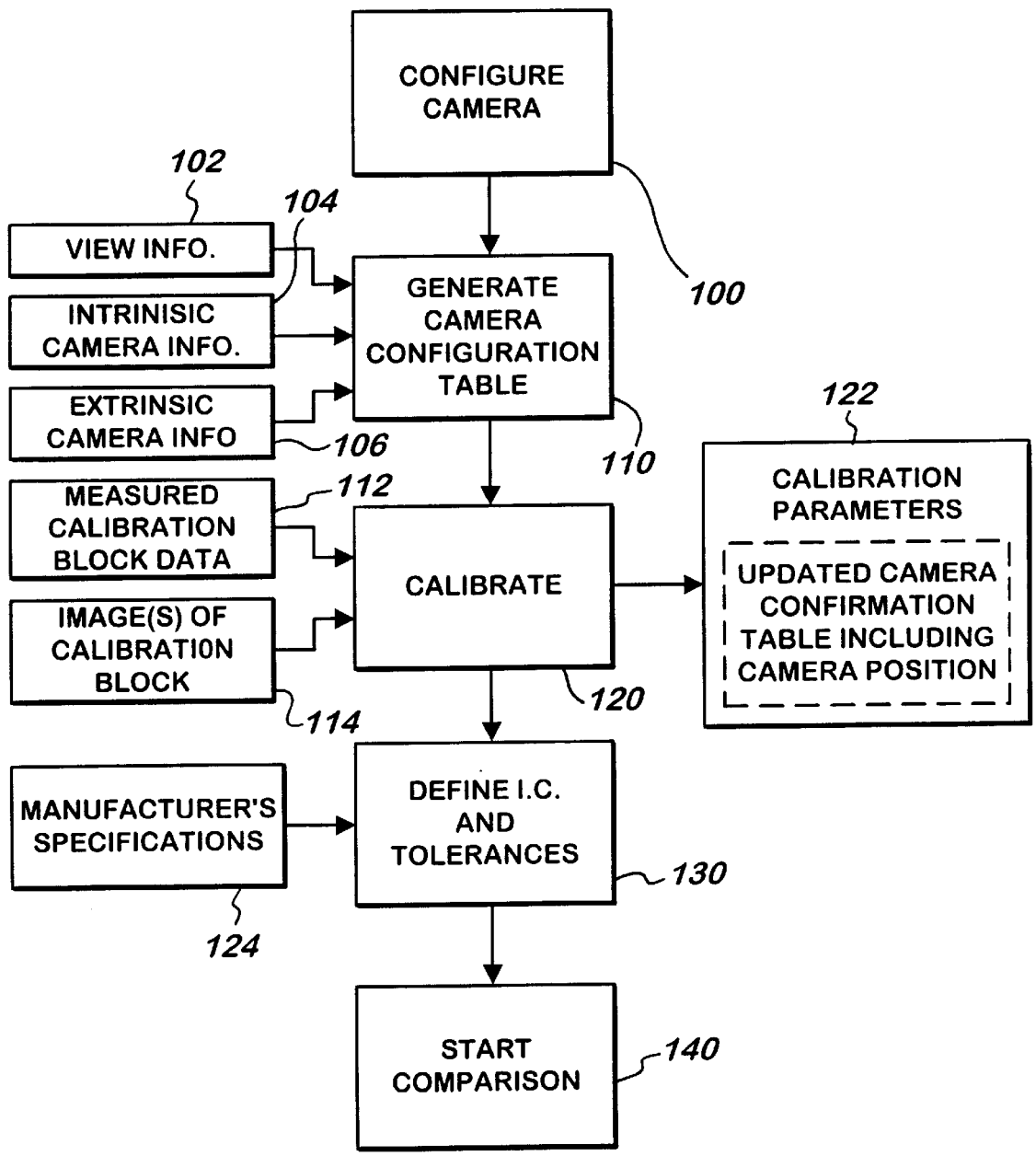
FIG. 4 is a flow diagram illustrating configuration of the system of FIG. 1 to accommodate different camera and mirror positions.

The operation of the IC lead inspection system 10 of the present invention is depicted by the flowchart of FIG. 4. The first step 100 is the configuration or positioning of cameras 30, 32. The cameras 30, 32 are positioned so as to provide unhindered side and top images of the leads 42, 44. Included in step 100 is the positioning of mirrors 22, 24 so that side views of leads 42, 44 are made available to the cameras 30, 32.

After the cameras 30, 32 have been configured to accommodate the needs of a user of the IC lead inspection system 10, the next step is the generation of a camera configuration table database 110. In order to generate a camera configuration table for the cameras 30, 32 configured in step 100, the following information is required to be input into a computer: view information 102; intrinsic camera information 104; and extrinsic camera information 106.

For the IC lead inspection system 10 of the present invention, the view information 102 comprises the following: view; camera; lead orientation; lead number direction; and mirror. "View" refers to one of the four images captured by cameras 30, 32 in FIGS. 1 and 2. Thus, view can be top image of side A, side image of side A, top image of side C or side image of side C. "Camera" refers to the camera 30 or 32 which captured the view. "Lead orientation" refers to the position of the leads vis-à-vis the body of the IC 40 in the view; e.g., North, South, East and West are used for this purpose. "Lead number direction" refers to the direction in the image in which the lead numbering ascends. Finally, "mirror" refers to the mirror 22, 24, if any, which is used to produce the view.

To illustrate, let's refer back to FIG. 3a. From FIG. 3a, the following view information 102 is obtained: view is top image of side C; camera is camera 32; lead orientation is South; lead number direction is counterclockwise; and mirror is none (only side images use mirrors).

Intrinsic camera information 104 comprises the following: pixel size; aspect ratio; image center and focal length. The "pixel size" need only be input for one direction since "aspect ratio", which is vertical length of a pixel divided by the horizontal length of a pixel, is also required to be defined. Note that if desired, aspect ratio can automatically be determined by requiring that the user of the IC lead inspection system 10 input the pixel size for the other direction. The "image center" provides the coordinates for the center of the image on camera 30, 32. The center of the image has been predefined to have coordinates (0, 0) in the present invention. During testing of the IC lead inspection system 10, it was found that defining the center of the image at (0, 0) worked satisfactorily to produce accurate results. However, the user of the IC lead inspection system 10 has the option of modifying the coordinates for the center of the image to produce better results. Finally, "focal distance" of the camera 30, 32 is determined during calibration.

For each view (e.g., side image of side C), the extrinsic camera information 106 comprises the following: the α, β and θ angles; the center of the camera 30, 32; and the camera distance from the object being imaged. The α angle refers to the angle formed between the view of the camera 30, 32 and the z-axis, as shown in FIG. 2. The β angle refers to the rotation of the camera 30, 32 about the y-axis. And θ angle refers to the rotation of the camera 30, 32 about the z-axis. Discussions about α, β and θ angles can be found in prior art references; thus, these will not be described in greater detail herein. However, it must be noted that unlike the prior art, the present invention requires the user to input approximations of these angles since the cameras 30, 32 are positioned by the user according to his needs, not pre-positioned by a seller of the system for inspecting IC leads.

The camera distance from the object being imaged must also be input by the user of the IC lead inspection system 10. Note that for each camera 30, 32, there are two distinct camera distances since the distance along line 52 is shorter than the distance along line 50 (see FIG. 2). Finally, the camera center is determined during calibration.

The IC lead inspection system 10 of the present invention, unlike prior art systems, requires the user to generate the camera configuration table by entering view information 102, intrinsic camera information 104 and extrinsic camera information 106 into the computer. As discussed above, the reason for this is because the present invention provides a configurable camera system. Each time cameras 30, 32 are moved, a new camera configuration table must be generated.

The next step in the flowchart of FIG. 4 is the calibration step 120. This step requires images to be produced of a block which is approximately the same size as the IC 40 to be inspected (step 114). These images are then stored in the computer for use during the calibration step 120. The block is chosen so that its relevant data are already known prior to the imaging step 114. This data is also inputted into the computer (step 112) for use during the calibration step 120.

During the calibration step 120, software specifically written for this step uses the images of the block generated by step 114 to calculate data about the block. The data produced from the block images are then compared to the known data for the block input at step 112 to produce calibration parameters. These parameters are then used to adjust the camera configuration table accordingly (step 122). Thus, values for the focal distance of the camera 30, 32 and the camera center are determined. Also, other values of the camera configuration table are adjusted, such as α, β and θ angles.

The calibration step 120 is required to be performed only when cameras 30, 32 are moved.

Following the calibration step 120, the IC 40 to be inspected must first be defined, as well as the acceptable tolerances (step 130). In order to define the IC 40, the IC manufacturer's specifications for the IC 40 must be provided, as shown in step 124. The following data for the IC 40 are typical of the data provided by manufacturer's specifications: number of leads on each side (A, B, C and D); tip-to-tip distance from side A to side C; tip-to-tip distance from side B to side D; width of each lead; the distance between neighboring lead centers (lead pitch); length of each lead; and the distance of each lead tip to the body of the IC (lead standoff).

In addition to defining the IC 40, the user of the IC lead inspection system 10 must also define the acceptable tolerances for the IC 40 to be inspected. The IC data and the acceptable tolerances data are then stored for use by the computer.

Figure 5:
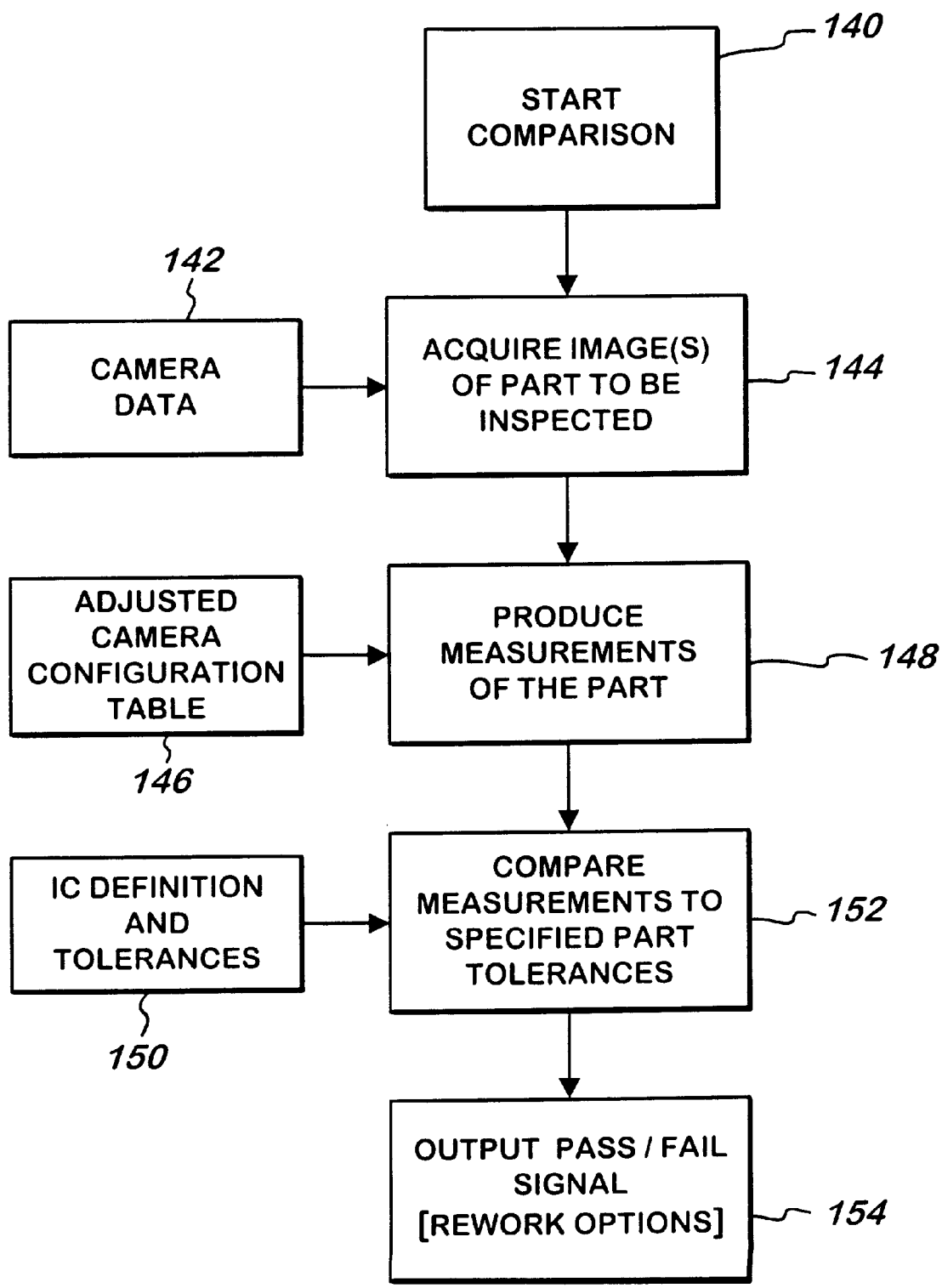
FIG. 5 is a flow diagram illustrating operation of the system of FIG. 1 to inspect IC leads.

Following step 130, the next step is the start comparison step 140. This step is shown in greater detail in FIG. 5. Now that the camera configuration table has been adjusted pursuant to the calibration parameters and the IC and acceptable tolerances have been defined, images of the IC 40 to be inspected are produced to be compared thereagainst (step 144). This means getting image data from the camera 30, 32 (step 142).

From the images produced in step 144, data for the IC 40 are produced (step 148). In generating this data, the calibrated camera configuration table from step 122 is utilized (step 146). The data generated in step 148 is then compared against the IC and the tolerances defined in step 130 at step 152. In order to carry out step 152, IC definition and tolerances from step 130 must be inputted (step 150).

Following the comparison in step 152, the computer generates an output which is indicative of whether the IC 40 imaged in step 144 is within the acceptable tolerances of the IC defined in step 130 (step 154).

FIG. 6 illustrates an example of a camera configuration table generated in step 110 of FIG. 4. The IC lead inspection system which generated the camera configuration table depicted in FIG. 6 is similar to the system shown in FIGS. 1 and 2. If the camera configuration changes, then the extrinsic camera information of the camera configuration table must be changed accordingly.

In another embodiment of a system of the present invention (not shown), only one camera is utilized. In this embodiment, the IC to be inspected must be rotated so that different sides of the IC come within the view of the camera. As is the case for the previously discussed embodiment, the one camera can be moved as desired by the user of the system.

Yet in another embodiment of a system of the present invention (not shown), more than two cameras may be utilized. The modifications required of the system 10 in FIG. 1 to accommodate more than two cameras should be apparent to those in the art.

Figure 7:
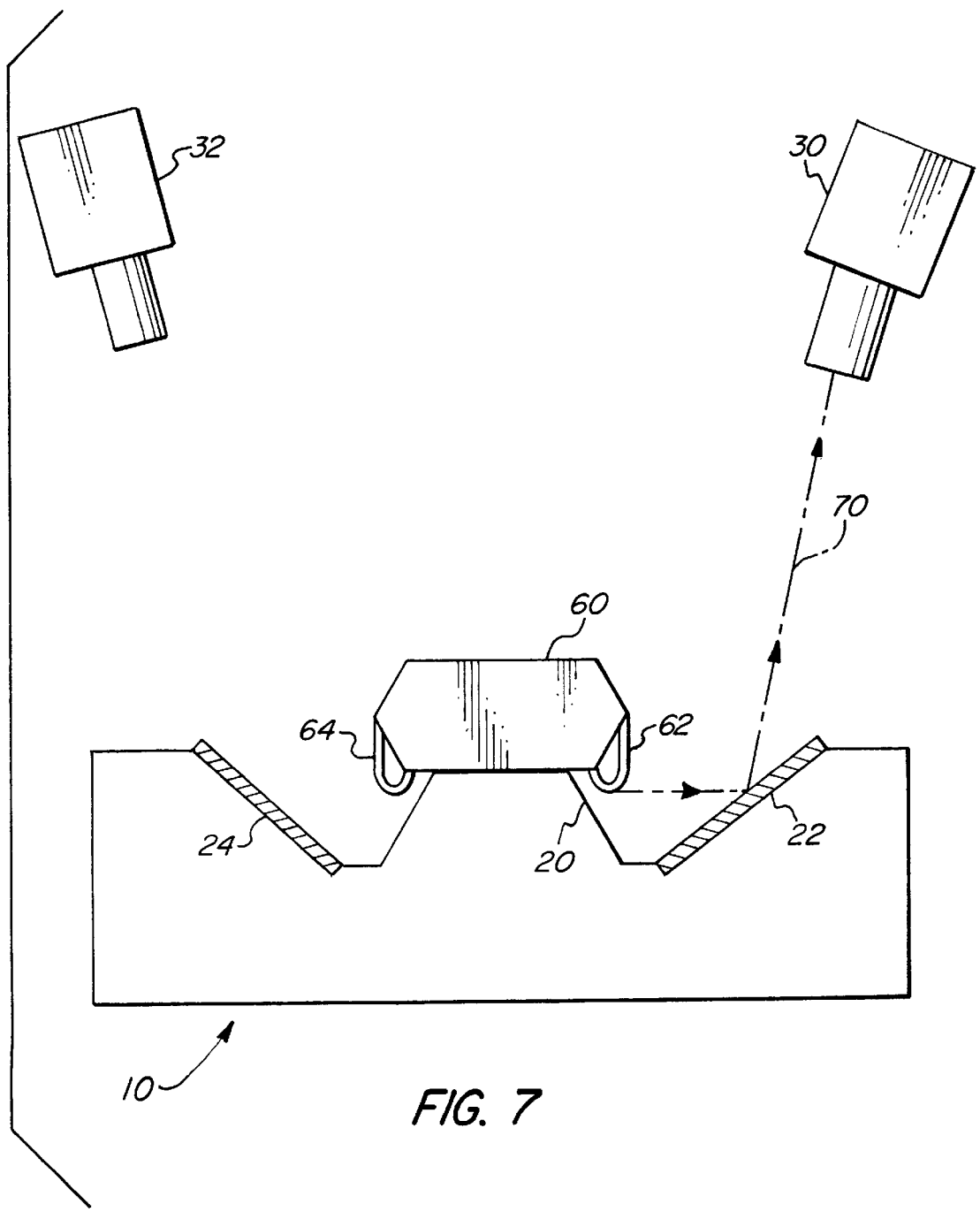
FIG. 7 is an end view of the system of FIG. 1 adjusted to accommodate J leads, instead of gull wing leads.

FIG. 7 shows the system 10 of FIG. 1 adjusted to accommodate "J" leads 62, 64 of an IC 60. Preferably, only side images of the leads 62, 64 are captured by cameras 30, 32 since top images will show very little of the leads 62, 64. In FIG. 7, camera 30 is shown capturing the side image of leads 62 (dofted line 70). Note that mirrors 22 and 24 are positioned accordingly to capture the side images of the J leads 62, 64. The modifications required of the system 10 in FIG. 7 to accommodate J leads should be apparent to those in the art.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for inspecting the leads of an IC comprising:

at least two cameras positioned out of a plane of the IC and away from a normal to the IC plane, the cameras being repositionable to any of numerous positions out of a plane of the IC and away from a normal to the IC plane relative to the IC;

mirrors arranged with respect to the cameras to obtain two views of the IC leads for each camera;

circuitry for digitizing frames of the views obtained from the cameras;

a set of configurable parameters for defining the position and orientation of the camera relative to the IC in each of the digitized frames; and a computer for computing, based upon the set of configurable parameters and the digitized frames, the position of the leads on the IC under inspection in three dimensions, and for comparing the calculated positions to ideal positions in determination of whether the IC leads meet desired manufacturing tolerances.

2. The system of claim 1 wherein a parameter of the set comprises an indication of which camera images which leads of the IC.

3. The system of claim 1 wherein a parameter of the set comprises an indication of whether the lead image is mirrored in the x direction.

4. The system of claim 1 wherein a parameter of the set comprises an indication of whether the lead image is mirrored in the y direction.

* * * * *